(12) United States Patent
Jagannathan et al.

(10) Patent No.: US 8,765,297 B2
(45) Date of Patent: Jul. 1, 2014

(54) ADVANCED GRAPHITE ADDITIVE FOR ENHANCED CYCLE-LIFE OF LEAD-ACID BATTERIES

(75) Inventors: Sudhakar Jagannathan, Alpharetta, GA (US); Melchor Fernandez Garcia, Alcala de Henares Madrid (ES)

(73) Assignee: Exide Technologies, Milton, GA (US)

( * ) Notice: Subject to any disclaimer, the term of this patent is extended or adjusted under 35 U.S.C. 154(b) by 524 days.

(21) Appl. No.: 12/984,023

(22) Filed: Jan. 4, 2011

(65) Prior Publication Data
US 2012/0171564 A1 Jul. 5, 2012

(51) Int. Cl.
H01M 6/04 (2006.01)
H01M 4/13 (2010.01)
H01M 4/57 (2006.01)

(52) U.S. Cl.
USPC .......................... 429/205; 429/228; 429/225

(58) Field of Classification Search
CPC .......... H01M 4/56; H01M 4/57; H01M 4/625
USPC .......................................... 429/205, 228, 225
See application file for complete search history.

(56) References Cited

U.S. PATENT DOCUMENTS

| | | | |
|---|---|---|---|
| 5,156,935 A | 10/1992 | Hohjo et al. | |
| 5,547,783 A | 8/1996 | Funato et al. | |
| 6,548,211 B1 | 4/2003 | Kamada et al. | |
| 7,517,370 B2 | 4/2009 | Petersen et al. | |
| 2006/0269801 A1 | 11/2006 | Honbo et al. | |
| 2007/0104981 A1 | 5/2007 | Lam et al. | |
| 2008/0003501 A1 | 1/2008 | Vincze et al. | |
| 2008/0089013 A1 | 4/2008 | Zhong et al. | |
| 2009/0317709 A1 | 12/2009 | Brazis et al. | |
| 2009/0325068 A1 | 12/2009 | Boden et al. | |
| 2010/0015531 A1 | 1/2010 | Dickinson, V et al. | |
| 2010/0033898 A1 | 2/2010 | Zhong et al. | |
| 2010/0040950 A1 | 2/2010 | Buiel et al. | |
| 2010/0203362 A1 | 8/2010 | Lam et al. | |

FOREIGN PATENT DOCUMENTS

| | | |
|---|---|---|
| EP | 1 739 771 A1 | 1/2007 |
| EP | 1 798 790 A1 | 6/2007 |
| EP | 1 876 663 A1 | 1/2008 |
| EP | 2262042 | 12/2010 |
| WO | 2008/070914 A1 | 6/2008 |
| WO | 2010/008392 A1 | 1/2010 |
| WO | 2011/056537 A2 | 5/2011 |

OTHER PUBLICATIONS

D.P. Boden, Selection of pre-blended expanders for optimum lead/acid battery performance, Journal of Power Sources 73, 1998, 89-92.

(Continued)

Primary Examiner — Helen O Conley
(74) Attorney, Agent, or Firm — Cantor Colburn LLP

(57) ABSTRACT

An Advanced Graphite, with a lower degree of ordered carbon domains and a surface area greater than ten times that of typical battery grade graphites, is used in negative active material (NAM) of valve-regulated lead-acid (VRLA) type Spiral wound 6V/25 Ah lead-acid batteries. A significant and unexpected cycle life was achieved for the Advanced Graphite mix where the battery was able to cycle beyond 145,000 cycles above the failure voltage of 9V in a non-stop, power-assist cycle-life test. Batteries with Advanced Graphite also showed increased charge acceptance power and discharge power compared to control groups.

16 Claims, 10 Drawing Sheets

(56) References Cited

OTHER PUBLICATIONS

M.P.J. Brennan and N.A. Hampson, Expander Action in Lead-Acid Battery, III. Impedance and Passivation Studies of Some Tanning Agents As Potential Expanders, Electroanalytical Chemistry and Interfacial Electrochemistry 54 (1974) X3-268.

K. R. Bullock et al.; Use of Conductive Materials to Enhance Lead-Acid Battery Formation, J. Electrochem. Soc., vol. 138, No. 12, Dec. 1991, pp. 3545-3549.

Applications for TIMREX (R) graphites, TIMCAL Ltd., 2003.

Yonglang Guo and Huan Liu, Current and potential distributions on positive plates with conductive $Pb_3O_4$ and $BaPbO_3$ in their formation and discharge, Journal of Power Sources 183 (2008) 381-387.

Hans Bode (Translated by Brodd and Kordesch), Lead-Acid Batteries, The Electrochemical Society, Inc., Chapters 1 and 3.

N.A. Hampson and J.B. Lakeman, Fundamentals of Lead-Acid Cells, Part XIII. The Influence of Additives on the Charge and Discharge Processes of the Negative Electrode, J. Electroanal. Chem., 119 (1981) 3-15.

Wen-Hong Kao and Kathryn R. Bullock, A Conductive Additive to Enhance Formation of a Lead/Acid Battery, J. Elctrochem. Soc., vol. 139, No. 4, Apr. 1992.

B. K. Mahato, Lead Acid Battery Expander, II. Expander Activity Correlation Between Microelectrode and Pasted Electrode, J. EZectrochem. Soc.: Electrochemical Science and Technology, Jul. 1981, pp. 1416-1422.

P.T. Moseley et al., The role of carbon in valve-regulated lead—acid battery technology, Journal of Power Sources 157 (2006) 3-10.

J.D. Newell et al., Porous microspheres as additives in lead—acid batteries, Journal of Power Sources 188 (2009) 292-295.

Andreas Züttel and Louis Schlapbach, Hydrogen-Carbon Studies, IEA Task 12: Metal Hydrides and Carbon for Hydrogen Storage 2001, pp. 108-113.

D. Pavlov et al., Influence of expander components on the processes at the negative plates of lead-acid cells on high-rate partial-state-of-charge cycling. Part I: Effect of lignosulfonates and $BaSO_4$ on the processes of charge and discharge of negative plates, Journal of Power Sources 195 (2010) 4435-4443.

D. Pavlov et al., Influence of expander components on the processes at the negative plates of lead-acid cells on high-rate partial-state-of-charge cycling. Part II. Effect of carbon additives on the processes of charge and discharge of negative plates, Journal of Power Sources 195 (2010) 4444-4457.

Rubha Ponraj et al., Investigation on electronically conductive additives to improve positive active material utilization in lead-acid batteries, Journal of Power Sources 189 (2009) 1199-1203.

Michael E. Spahr et al., Poster, Comparison of the Porosity and Surface Properties of High Surface Area Graphite and Carbon Black Catalyst Supports, TIMCAL Graphite & Carbon.

Masaaki Shiomi et al., Effects of carbon in negative plates on cycle-life performance of valve-regulated lead/ acid batteries, Journal of Power Sources 64 (1997) 147-152.

Technical Data Sheet for TIMREX (R) HSAG300, High Surface Graphite, TIMCAL Graphite & Carbon.

G. Toussaint et al., Effect of additives in compressed lead-acid batteries, Journal of Power Sources 144 (2005) 546-551.

International Application No. PCT/US2011/067137 International Search Report dated Sep. 7, 2012, 5 pages.

Wide angle x-ray diffraction and Thermogravimetric analysis results of standard battery grade graphite and advanced graphite.

| Sample | Wide angle X-ray Diffraction | | | | Thermogravimetry | | Surface area |
|---|---|---|---|---|---|---|---|
| | Peak position 2θ | d-spacing Å | FWHM | Normalized Peak intensity % | Crystallinity % | Degradation Onset (°C) | Degradation end (°C) | BET (m²/g) |
| Standard Graphite | 26.27 | 3.39 | 0.51 | 100 | 74 | 698 | 809 | 21 |
| Advanced Graphite | 26.18 | 3.40 | 0.79 | 69 | 60 | 642 | 827 | 330 |

Fig. 1c

Initial characterization of spiral 6V/25 Ah modules

| Sample | Battery Weight (Kg) | Internal resistance (25 °C, 1 kHz) (mΩ) | C20 (1.2A/5.25V) (Ah) | Reserve Capacity (25A/5.25V) (min) | HR Discharge (-18 °C) (400 A / 3.6 V) | | |
|---|---|---|---|---|---|---|---|
| | | | | | Internal resistance (mΩ) | $V_{10s}$ (V) | $D_{3.6V}$ (s) |
| No Carbon | 4.68 | 2.22 ± 0.07 | 24.9 ± 0.9 | 40.3 ± 1.1 | 3.04 | 4.18 ± 0.07 | 32 ± 4 |
| Standard Graphite - Carbon Mix | 4.71 | 2.33 ± 0.06 | 24.6 ± 0.3 | 38.4 ± 0.8 | 2.94 | 4.19 ± 0.07 | 26 ± 4 |
| Advanced Graphite | 4.77 | 2.21 ± 0.07 | 25.1 ± 0.9 | 42.7 ± 1.2 | 3.07 | 4.21 ± 0.05 | 34 ± 2 |

Fig. 1d

ADVANCED GRAPHITE ADDITIVE FOR ENHANCED CYCLE-LIFE OF LEAD-ACID BATTERIES

TECHNICAL FIELD

The present disclosure relates generally to lead-acid batteries, and more particularly to an Advanced Graphite additive to enhance the cycle life of lead-acid batteries, to batteries containing such an additive, a paste for such batteries, and methods for making such batteries.

BACKGROUND

The lead-acid battery is the oldest and most popular type of rechargeable energy storage device, dating back to the late 1850's when initially conceived by Raymond Gaston Plante. Despite having a very low energy-to-weight ratio and a low energy-to-volume ratio, the lead-acid battery can supply high-surge currents, allowing the cells to maintain a relatively large power-to-weight ratio. These features, along with their low cost, make lead-acid batteries attractive for use in motor vehicles, which require a high current for starter motors. A lead-acid battery is generally composed of a positive electrode and a negative electrode in an electrolyte bath. Typically, the electrodes are isolated by a porous separator whose primary role is to eliminate all contact between the electrodes while keeping them within a minimal distance (e.g., a few millimeters) of each other. A separator prevents electrode short-circuits by containing dendrites (puncture resistance) and reducing the Pb deposits in the bottom of the battery.

A fully charged, positive lead-acid battery electrode is typically lead dioxide ($PbO_2$). The negative current collector is lead (Pb) metal and electrolyte is sulfuric acid ($H_2SO_4$). Sulfuric acid is a strong acid that typically dissociates into ions prior to being added to the battery:

$$H_2SO_4 \rightarrow H^+ + HSO_4^-$$

As indicated in the following two half-cell reactions, when this cell discharges, lead metal in the negative plate reacts with sulphuric acid to form lead sulphate ($PbSO_4$), which is then deposited on the surface of the negative plate.

$$Pb(s)+HSO_4^-(aq) \rightarrow PbSO_4(s)+H^+(aq)+2e^- \text{ (negative-plate half reaction)}$$

$$PbO_2(s)+3H^+(aq)+HSO_4^-(aq)+2e^- \rightarrow PbSO_4(s)+2H_2O \text{ (positive-plate half reaction)}$$

During the discharge operation, acid is consumed and water is produced; during the charge operation, water is consumed and acid is produced. Adding the two discharge half-cell reactions yields the full-cell discharge reaction:

$$Pb+PbO_2+2H_2SO_4 \rightarrow 2PbSO_4+2H_2O \text{ (full-cell discharge equation)}$$

When the lead-acid battery is under load, an electric field in the electrolyte causes negative ions (in this case bisulfate) to drift toward the negative plate. The negative ion is consumed by reacting with the plate. The reaction also produces a positive ion (proton) that drifts away under the influence of the field, leaving two electrons behind in the plate to be delivered to the terminal.

Upon recharging the battery, $PbSO_4$ is converted back to Pb by dissolving lead sulphate crystals ($PbSO_4$) into the electrolyte. Adding the two charge half-cell reactions yields the full-cell charge reaction.

$$PbSO_4(s)+H^+(aq)+2e^- \rightarrow Pb(s)+HSO_4^-(aq) \text{ (negative-plate half reaction)}$$

$$PbSO_4(s)+2H_2O \rightarrow PbO_2(s)+3H^+(aq)+HSO_4^-(aq)+2e^- \text{ (positive-plate half reaction)}$$

$$PbSO_4(s)+H^+(aq)+2e^- \rightarrow Pb(s)+HSO_4^-(aq) \text{ (full-cell charge equation)}$$

When the battery repeatedly cycles between charging and discharging, the efficiency of dissolution of $PbSO_4$ and conversion to Pb metal decreases over time. As a result, the amount of $PbSO_4$ continues to increase on the surface of negative plate and over time forms an impermeable layer of $PbSO_4$, thus restricting access of electrolyte to the electrode.

Over the years, several additives including expanders have been used in an attempt to lessen the growth of lead sulphate and improve battery performance. Expanders act as anti-shrinkage agents and are an important component of lead/acid batteries because they prevent performance losses in negative plates that would otherwise be caused by passivation and structural changes in the active material. To make a negative plate spongy and prevent the solidification of lead, expanders were developed from a mixture of carbon black, lignin derivatives (e.g., lignosulphate, lignosulfonates), and barium sulphate ($BaSO_4$). These expanders can be incorporated into a battery's negative plates in several ways, including adding the individual components to a paste mix and adding a pre-blended formulation.

Carbon black is typically added to the negative active material (NAM) to increase: (i) electrical conductivity; (ii) surface area of the NAM; and (iii) nucleating $PbSO_4$ crystals. Carbon black is substantially pure elemental carbon, typically in the form of colloidal particles produced by an incomplete combustion or thermal decomposition of gaseous or liquid hydrocarbons under controlled conditions. It is a black, finely-divided pellet or powder.

The presence of lignin derivatives (e.g., lignosulphate, lignosulfonates, and other complex aromatic polyethers) helps prevent the formation of an obstructive $PbSO_4$ layer on the electrode surface and facilitates the formation of a porous layer built up of individual $PbSO_4$ crystals. Lignin derivatives have the property of being strong antiflocculents (e.g., they prevent colloids from coming out of suspension in the form of flocs or flakes) and are composed of a large hydrophobic organic part ($R^+$) and a small hydrophilic inorganic fraction ($SO_3^-$). As a result, lignin derivatives are water soluble. For example:

$$RSO_3Na \rightarrow RSO_3^- + Na^+$$

The hydrophobic part of the $RSO_3^-$ anion will be adsorbed on the surface of the lead particles, and thus the hydrophilic part of the anion will phase-out to the aqueous electrolyte phase. This results in an increase in the repulsion potential, which prevents the particles from coalescing or sintering. Many different lignosulfonates have been used in expanders; however, their effects on the performance of lead/acid batteries varies dramatically based on the expander formula and battery type application (e.g., Starting, Motive, Standby).

Barium sulfate, being isomorphic to $PbSO_4$, acts as a nucleation agent and ensures uniform distribution of $PbSO_4$ crystals throughout the active mass volume. The ability of barium sulfate to act as a site for lead sulfate precipitation is due to the similar structures of the two compounds. Strontium sulfate has also been shown to be an effective expander. The inert barium sulfate provides a large number of sites for the precipitation of lead sulfate crystallites and thereby prevents its deposition as a thin, impermeable, passivating $PbSO_4$ film.

A notable difference between expanders used in automotive and industrial applications is the ratio of barium sulfate to carbon. For example, in automotive batteries, a high fraction of lignosulfonate (25-40%) may be used, whereas in industrial batteries a smaller percentage of lignosulfonate may be used (0-10%). The higher percentage of lignosulfonate in automotive plates may be useful in producing high cold-cranking amperes, whereas a larger amount of barium sulfate in industrial plates may help prevent passivation during deep cycling and provide greater durability.

Conductive additives in positive plates, such as $BaPbO_3$ (Barium metaplumbate); $Pb_3O_4$ (Red lead), Titanium based compounds (e.g., $Ti_4O_7$, $TiSi_2$, $TiO_2$), and graphite have been used to improve the power density and corrosion resistance in lead-acid batteries. Similarly, higher surface area additives (e.g., glass microspheres, particulate silica, zeolite, and porous carbons) have also been added to negative paste to improve electrolyte access and enhance cycle life.

For several decades, carbon has been a popular additive to the NAM in lead-acid batteries. Although the role of carbon in NAM may be generally unclear, several beneficial effects have been identified. For example, carbon nucleates the $PbSO_4$ crystals, resulting in smaller crystals that may be more easily dissolved into the electrolyte during charging processes. This restricts the progress of plate sulfation (e.g., formation of a $PbSO_4$ layer) and increases the useful life of the battery in high-rate, partial state-of-charge (HRPSoC) duty. High surface-area carbons can act as a reservoir for electrolyte within NAM, thus reducing the possibility of plate dry-out.

A combination of highly conductive graphite, high surface area carbon black and/or activated carbon is often used in NAM. In graphite, the atoms are typically arranged in planar hexagonal networks (e.g., graphene layers) held together by strong $sp^2$ bonds resulting in high in-planar electronic conductivity. A disordered carbon typically arises when a fraction of carbon atoms is $sp^3$ hybridized rather than $sp^2$. The electronic conductivity of mixed carbon depends on the distribution of $sp^3$ carbon in $sp^2$ domains. Although graphite additives in active material decrease the resistivity of the paste by forming a conductive path around the $PbSO_4$ crystals, they are reported to have lower surface areas (typically in the order of 10-30 $m^2/g$). A second carbon additive is generally required to increase the total surface area of the NAM to improve the accessibility of electrolyte. Carbon blacks and activated carbons with surface areas between 200-2000 $m^2/g$ may be added in conjunction with graphite to improve surface area as well as electronic conductivity. Activated carbon is a form of carbon that has been processed to greatly increase porosity, thus greatly increasing its surface area (e.g., 1 gram of activated carbon may have surface area in excess of 500 $m^2$).

Numerous attempts have been made to overcome the above-mentioned problems. For example, U.S. Pat. No. 6,548,211 to Kamada, et al., discloses the addition of graphite powder having a mean particle size smaller than 30 μm added in the range of about 0.3% to 2% by weight. U.S. Patent Publication No. 2010/0015531 to Dickinson, et al., discloses a paste for negative plate of lead acid battery having a activated carbon additive loadings of 1.0% to 2.0% by weight. The activated carbon additive, taught by Dickinson, has a mesopore volume of greater than about 0.1 $cm^3/g$ and a mesopore size range of about 20-320 angstroms (Å) as determined by the DFT nitrogen adsorption method. U.S. Patent Publication No. 2010/0040950 to Buiel, et al. describes a negative electrode having a mixture of activated carbon (~5-95% by weight), lead (5-95% by weight), and conductive carbon (5-20% by weight). U.S. Pat. No. 5,547,783 to Funato, et al., describes various additives, including carbon, acetylene black, polyaniline, tin powder, and tin compound powder having an average particle diameter of 100 μm or less. U.S. Pat. No. 5,156,935 to Hohjo, et al., describes electro-conductive whiskers made of carbon, graphite or potassium titanate—useful as additives for the negative plate of a lead-acid battery—having a diameter of 10 μm or less, aspect ratio of 50 or more, and a specific surface area of 2 $m^2/g$ (21). Unfortunately, none of these previous attempts have been able to achieve the benefit of both higher surface area and higher electronic conductivity in a single carbon material.

Carbon blacks and activated carbons have the ability to accept a higher charge because of their higher surface areas and enhanced electrolyte accessibility. Unfortunately, because of their porous structures, carbon blacks and activated carbons have poor retention on particle size during paste mixing and cycling. As a result, carbon blacks and activated carbons often disintegrate, causing the carbon to bleed out of the plate over period of time, resulting in active material shedding from the grids.

Graphites, by contrast, with ordered structures, are advantageous because they are both inert to electrochemical reactions during charge-discharge cycles and resist disintegration during cycle life tests over an extended period. Unfortunately, graphites have lower surface areas, thus restricting electrolyte access and resulting in an active material with lower charge acceptance.

Despite the numerous existing battery additives, there is a need for an improved battery additive that. (i) is inert to electrochemical reactions during charge-discharge cycles; (ii) resists disintegration during cycle life tests over an extended period; and (iii) yields an increased charge acceptance.

SUMMARY OF THE INVENTION

A graphitic carbon with a greater degree of defective sites in regular graphene layers is disclosed herein. Lower regularity of graphitic layers results in graphite with an advantageous surface area of about 300 $m^2/g$, as compared to typical graphite surface areas, which are between 10 and 30 $m^2/g$.

According to a first aspect of the present invention, an energy storage device comprises: an electrode comprising lead; an electrode comprising lead dioxide; a separator between the electrode comprising lead and the electrode comprising lead dioxide; an aqueous solution electrolyte containing sulfuric acid; and a carbon-based additive having a specific surface area of approximately 250 to 550 $m^2/g$.

According to a second aspect of the present invention, a paste suitable for a negative plate of battery that includes a carbon-based additive and has a surface area of at least 3 $m^2/g$ when an amount of the carbon additive in the paste is approximately 2 to 3% by weight.

According to a third aspect of the present invention, a battery including a negative plate comprises: a carbon-based additive having a surface area of at least 3 $m^2/g$ when an amount of the carbon-based additive in a paste is approximately 2 to 3% by weight.

In certain embodiments, the carbon-based additive may be a graphite material having a specific surface area of approximately 250 to 350 $m^2/g$ and may be mixed with a negative, dry, unformed paste having a surface area greater than 3 $m^2/g$. The concentration of the carbon-based additive relative to the paste may be approximately 2 to 3% by weight.

In alternative embodiments, the carbon-based additive may be a disordered carbon additive (including, for example, Advanced Graphite) in negative active material with (i) crystallinity of 60% or lower, (ii) degradation onset temperature of 650° C. or lower; and (iii) degradation temperature range of a minimum 170° C. or higher.

The carbon-based additive of the forgoing may also be used in a paste for a negative plate of battery and further may have: (A) a total pore volume of greater than about 0.2 cm³/g with a predominant pore size of less than 20 Å; (B) a total pore volume of greater than about 0.2 cm³/g with a predominant pore size of 20 Å-500 Å.; and/or (C) a total pore volume composed of (i) between about 20 and 40 percent microporous carbon particles of the total amount of carbon-based additive by weight; (ii) between about 60 and 70 percent mesoporous carbon particles of the total amount of carbon-based additive by weight; and (iii) between about 0 and 10 percent macroporous carbon particles of the total amount of carbon-based additive by weight.

According to a fourth aspect of the present invention, a method comprises the steps of introducing carbon-based particles into a paste mix to form a carbon paste material, the carbon-based particles having a specific surface area of approximately 250 to 550 m²/g; providing the carbon paste material on a battery grid; and curing the paste material.

As a result of the forgoing, the charge acceptance power of a battery or energy storage device should improve by 50% or greater at all states-of-charge, and discharge power should improve up to 35% with greater improvements at lower states-of-charge compared to standard, no-carbon batteries. Advanced Graphite containing groups should have 50% or higher charging current under micro-hybrid dynamic charge acceptance test (mDCAT) test and last at least twice as many cycles as compared to standard, no-carbon batteries.

DESCRIPTION OF THE DRAWINGS

These and other advantages of the present invention will be readily understood with reference to the following specifications and attached drawings wherein:

FIG. 1c is a chart depicting wide-angle X-ray diffraction and thermogravimetric analysis results of standard, battery-grade graphite and Advanced Graphite;

FIG. 1d is a chart depicting initial characterization of spiral 6V/25 Ah modules;

DETAILED DESCRIPTION

Preferred embodiments of the present invention will be described hereinbelow with reference to the accompanying drawings. In the following description, well-known functions or constructions are not described in detail because they would obscure the invention in unnecessary detail.

A graphitic carbon with a greater degree of defective sites in regular graphene layers is disclosed herein. Lower regularity of graphitic layers results in an Advanced Graphite with a highly advantageous surface area, e.g., about 250-350 m²/g, as compared to typical numbers of between 10-30 m²/g. A carbon based additive (e.g., Advance Graphite) would preferably have a surface area between 20 and 900 m²/g, with a more preferred range of about 20-750 m2/g, or even more preferred 20-550 m2/g, or even more preferred 20-450 m²/g. However, a most preferred range would be about 250-350 m²/g. A suitable off-the-shelf Advanced Graphite substitute may include, for example, HSAG 300 and HSAG 400. HSAG 300, available from Timcal AG (www.timcal.com), is a high purity graphite (<0.22% ash) with a specific surface area of 280-300 m² g. Alternatively, carbon nanotubes may be used as a carbon-based paste additive. Carbon nanotubes are hexagonally shaped arrangements of carbon atoms that have been rolled into molecular-scale tubes of graphitic carbon. Carbon nanotubes have been constructed with length-to-diameter ratio of up to 132,000,000:1, therefore yielding a very high surface area to volume ratio.

During research and development of the Advanced Graphite and Advanced Graphite paste, a number of experimental methods and devices were employed: (i) the structures of graphite powder samples were analyzed using X-ray diffraction; (ii) degradation behavior was examined using a thermogravimetric analyzer; and (iii) surface area and pore-size distribution were probed using a surface area analyzer. Powder X-ray diffraction was performed using a Siemens D5000 X-Ray Diffractometer operated at 20 kV, 5 A. Thermogravimetric analysis (TGA) was performed using a TA instruments TGA Q500 by heating the graphite powder sample up to 1,000° C. at the rate of 20° C./min. Surface area and pore-size distribution were measured using nitrogen gas adsorption on a Micromeritics Tristar 3020. Data were analyzed using Brunauer, Emmett, and Teller (BET) and density functional theory (DFT) methods.

Figure 2A:
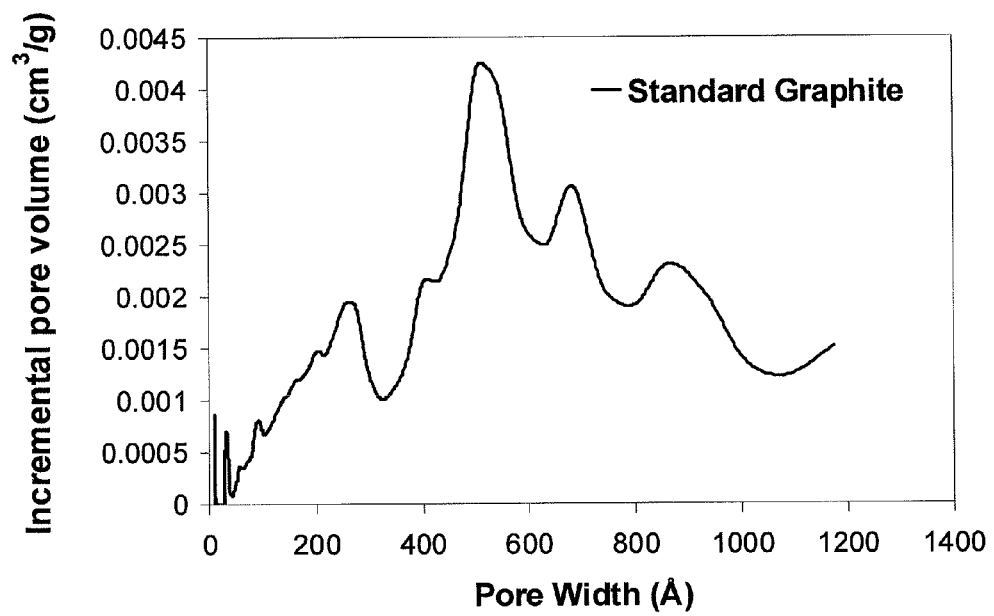
FIG. 2a is a graph representing pore-volume distribution calculated by density functional theory (DFT) method for standard, battery-grade graphite.
Figure 2B:
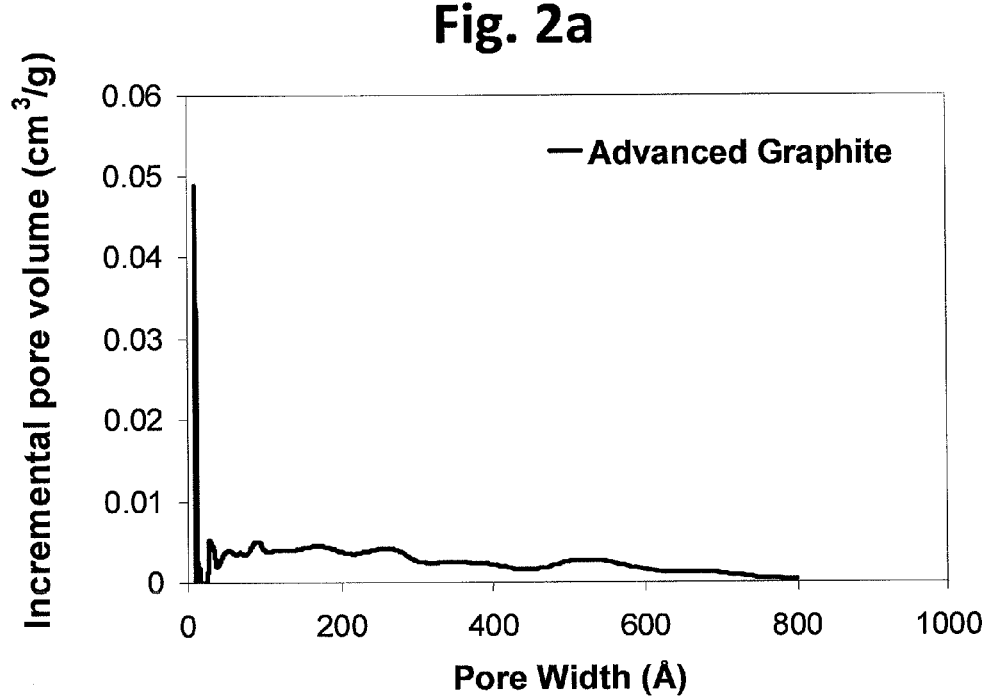
FIG. 2b is a graph representing pore-volume distribution calculated by density-functional theory (DFT) method for Advanced Graphite.

Referring first to FIG. 2a, a graph representing pore-volume distribution calculated by the DFT method for a standard, battery-grade graphite is shown, while FIG. 2b represents the pore-volume distribution for Advanced Graphite.

FIG. 2a shows that the pore volume for standard graphite is relatively low (less than $4.5 \times 10^{-3}$ cm³/g) for the entire range of pores measured for nitrogen gas adsorption with a wide pore range distribution. As a result, the surface area of standard graphite is relatively low, thus restricting electrolyte access, resulting in an active material with lower charge acceptance.

FIG. 2b, by contrast, shows that Advanced Graphite has a much higher pore volume for pore widths (0-800 Å) with a peak of 0.05 cm$^3$/g with predominantly micro (less than 20 Å) and meso (20-500 Å) porosity. Depending on the batch, Advanced Graphite may further contain an trivial amount of macro (greater than 500 Å) pore widths, typically between 0 and 10%. Advanced Graphite with predominantly micro and meso porosity has a total pore volume approximately 3 times greater than standard graphite (0.2 cm$^3$/g for advanced graphite vs. 0.065 cm$^3$/g for standard graphite). As a result, the surface area of standard graphite is much greater, thus allowing electrolyte access, resulting in an active material with higher charge acceptance. To test and compare the Advanced Graphite against various negative pastes, spiral wound 6V/25 Ah modules and prismatic 14.4V/78 Ah valve-regulated lead-acid (VRLA) type absorbed glass mat (AGM) batteries were assembled with three different compositions of negative paste, including (i) a control negative mix having no additional carbon; (ii) a negative mix with 1%-by-weight standard graphite and 1%-by-weight, standard carbon black; and (iii) a negative mix with 2% by weight Advanced Graphite. AGM batteries, instead of using a gel or liquid electrolyte, use a fiberglass like separator to hold the electrolyte in place. The physical bond between the separator fibers, the lead plates, and the container make AGMs spill-proof and the most vibration and impact resistant lead-acid batteries available today. Even better, AGM batteries use almost the same voltage setpoints as flooded cells and thus can be used as drop-in replacements for flooded cells.

Initial characterization of the modules included 20-hour capacity (discharge at 1.2 A to 5.25V at 25° C.), reserve capacity (discharge at 25 A to 5.25V at 25° C.) and cold cranking (discharge at 400 A to 3.6V at −18° C.). After each test, the modules were recharged at 6 A/7.2V/20 h+4 h/0.6 A. For the sake of accuracy during the testing, battery weights, internal resistance, and low-rate and high-rate discharges for each group were equivalent at onset. The average results for the initial characterizations of the modules of the three groups of modules are summarized in FIG. 1d. FIG. 1d clearly show that all batteries had a comparable initial performance parameters, thus suggesting that any change in performance during the testing would be due to the various paste additives, and not variations in the battery construction.

In hybrid electric vehicle applications, the power on discharge for a battery and the charge acceptance power are of great importance. Discharge power determines the degree of achievable electrical boosting during the acceleration period, while the charge acceptance affects the degree of utilization of the regenerative braking energy during the deceleration step. To simulate the different conditions in which the battery can work in the vehicle, the tests were conducted at different State-of-Charge's (SoC) ranging from 20% to 100%. A constant voltage of 16V was used for 5 seconds at 25° C. for charge acceptance power while a voltage of 10V was used for 10 seconds at 25° C. for discharge power measurement.

A Micro-hybrid dynamic charge acceptance test (mDCAT) was performed on prismatic batteries at 80% SoC. The test cycle included multiple micro-cycles with different discharge currents (i.e., discharge at 48 A for 60 s, discharge at 300 A for 1 s, rest for 10 s, charge at 100 A to 100% SoC, discharge at 7 A for 60 s and rest for 10 s) including a high current pulse. The test cycle included a total of 500 microcycles with 6 hour rest time.

Power-assist, cycle life tests were also performed to determine the influence of the three different negative plate formulations in the evolution of capacity, voltage, and internal resistance under partial state-of-charge cycling. The profile used for testing was based on the European Council for Automotive R&D (EUCAR) procedure for Hybrid Electric Vehicles (HEV) and had to be repeated 10,000 times (on one unit) with the battery at 60% SoC and 2.5% depth-of-discharge.

The evolution of end voltage, capacity, weight loss, and internal resistance is recorded every 10,000 cycles. The battery was rested for 6 hours after every 10,000 cycles to allow the electrolyte to stabilize. At end of discharge, a voltage of 5V (per 6V module) reached along the cycling, or a battery capacity under 50% of initial value, was considered battery failure criteria. From previous Advanced Lead-Acid Battery Consortium (ALABC) reports, power-assist cycle life in the range 200,000-220,000 cycles has been obtained for different NAM formulations that included additions of different types of graphites and combination carbon black and graphite in the range 1%-1.5%. A non-stop, power-assist, cycle-life test, in which the battery is cycled continuously without rest step at 10,000 cycle intervals, has been devised to simulate real life test conditions. This test helps in differentiating the various grades of carbons that produced similar test in a standard, EUCAR, power-assist cycle-life test.

The results show the negative mix with 2% by weight Advanced Graphite greatly outperformed both the standard negative mix and the negative mix with 1% by weight Standard Graphite and 1% by weight Standard Carbon Black. In reviewing the results, a wide-angle X-ray diffraction (WAXD) was used to determine the regularity of carbon structures. Diffraction peaks at a specific angle appeared due to constructive interferences from X-rays diffracted from periodic crystal structures. For graphite, the only periodic structure is the arrangement of graphene sheets in the z-direction. The distance between these carbon layers is a constant ~3.35 Å. Diffraction from these sheets (002 plane) of graphite results in a diffraction peak at 2θ~26°.

A crystalline solid consists of regularly spaced atoms (electrons) that may be described using imaginary planes. The distance between these planes is called the d-spacing where the intensity of the d-space pattern is typically directly proportional to the number of electrons (atoms) that are found in the imaginary planes. Every crystalline solid will have a unique pattern of d-spacing (also known as the powder pattern), which may be analogous to a "finger print" for a solid. The peak position and d-spacing remains constant for all grades of graphite while intensity of the peak varies based on the amount of defects present in the sample quantified by crystallinity percentage of the sample. Carbon black (and activated carbon) have no peak due to the absence of periodic structure. Full width at half maximum (FWHM) of a peak is a measure of crystal size distribution where a smaller FWHM (narrow peak) corresponds to smaller distribution of crystal sizes. Surface area is in general inversely related to crystallinity percentages (lower defects in carbon, lower surface area).

Figure 1A:
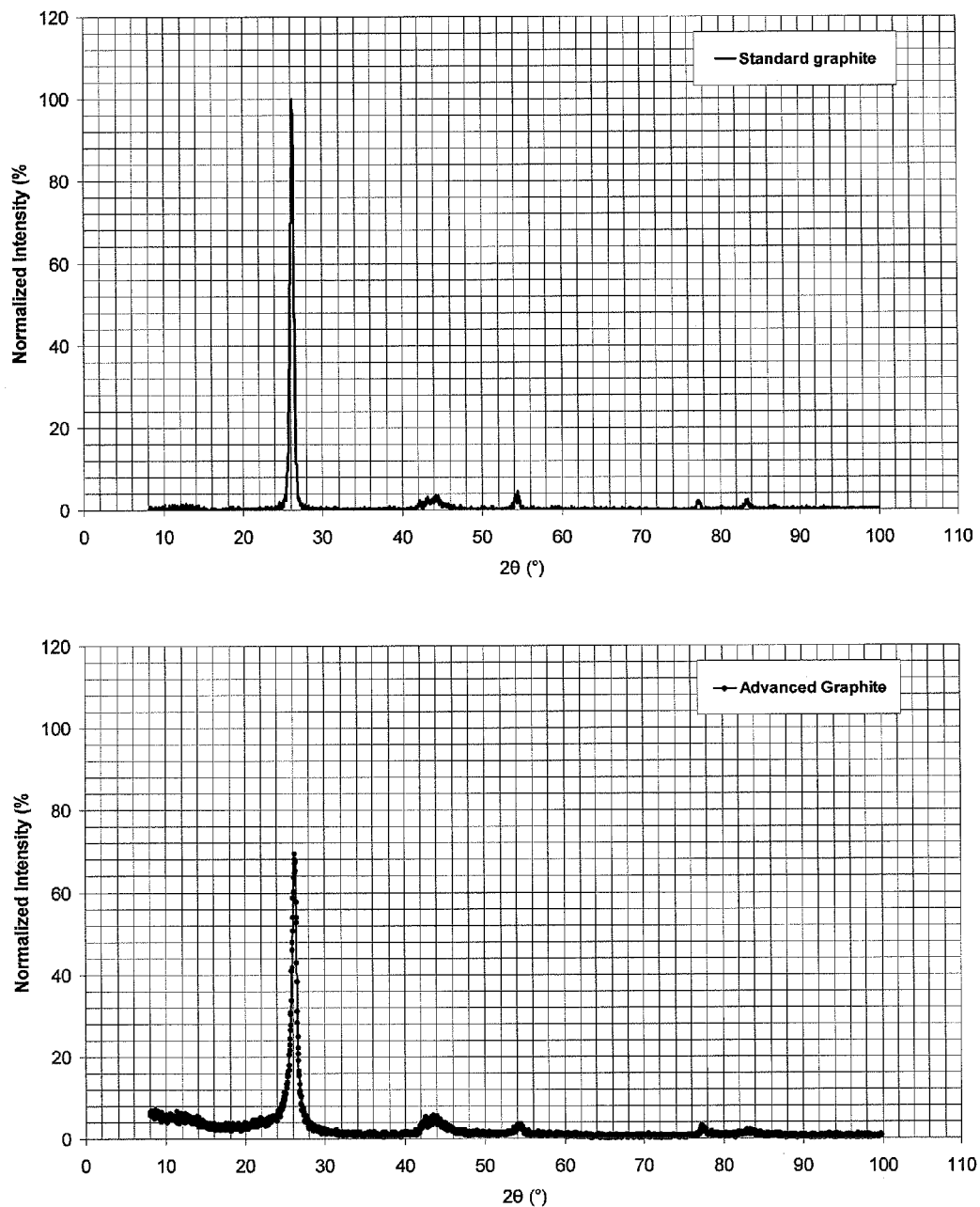
FIG. 1a is a graph representing the extent of periodic graphene layers compared by two-dimensional, wide-angle X-ray diffraction.

WAXD and TGA results for standard battery grade graphite, as well as the Advanced Graphite of the present application, are provided in FIGS. 1a through 1d. Diffraction peak position (2θ~26°) as well as d-spacing (3.4 Å) for two grades were consistent with diffraction patterns from graphene layers. The peak intensity for the disclosed Advanced Graphite was about ~70% of standard battery grade graphite, indicating greater defects on graphite structures. The chart in FIG. 1c represents a comparison of the wide angle x-ray diffraction and thermogravimetric analysis results of standard battery grade graphite and Advanced Graphite.

As indicated in FIG. 1c, Advanced Graphite also has a lower crystallinity percentage (60%) and a wider full width at half maximum (FWHM) value (0.79) (i.e., larger size distribution) compared to standard graphite, yielding higher defective carbon sites. The lower crystallinity percentage indicates higher defects in the Advance Graphite structure, providing a significantly greater surface area. Advanced Graphite's surface area was found to be over ten times greater than the surface area of standard graphite (330 $m^2/g$ versus 21 $m^2/g$). Despite the higher surface area, the positive attributes of advanced graphite remained virtually unchanged. For example, according to the thermogravimetry tests, both standard graphite and Advanced Graphite had comparable degradation values, indicating that, unlike high surface area carbon black and activated carbon, the graphite will not degrade as much over time. Essentially, Advanced Graphite combines the stability of standard graphite with the high surface area of carbon blacks and activated carbons in a single carbon-based additive.

Figure 1B:
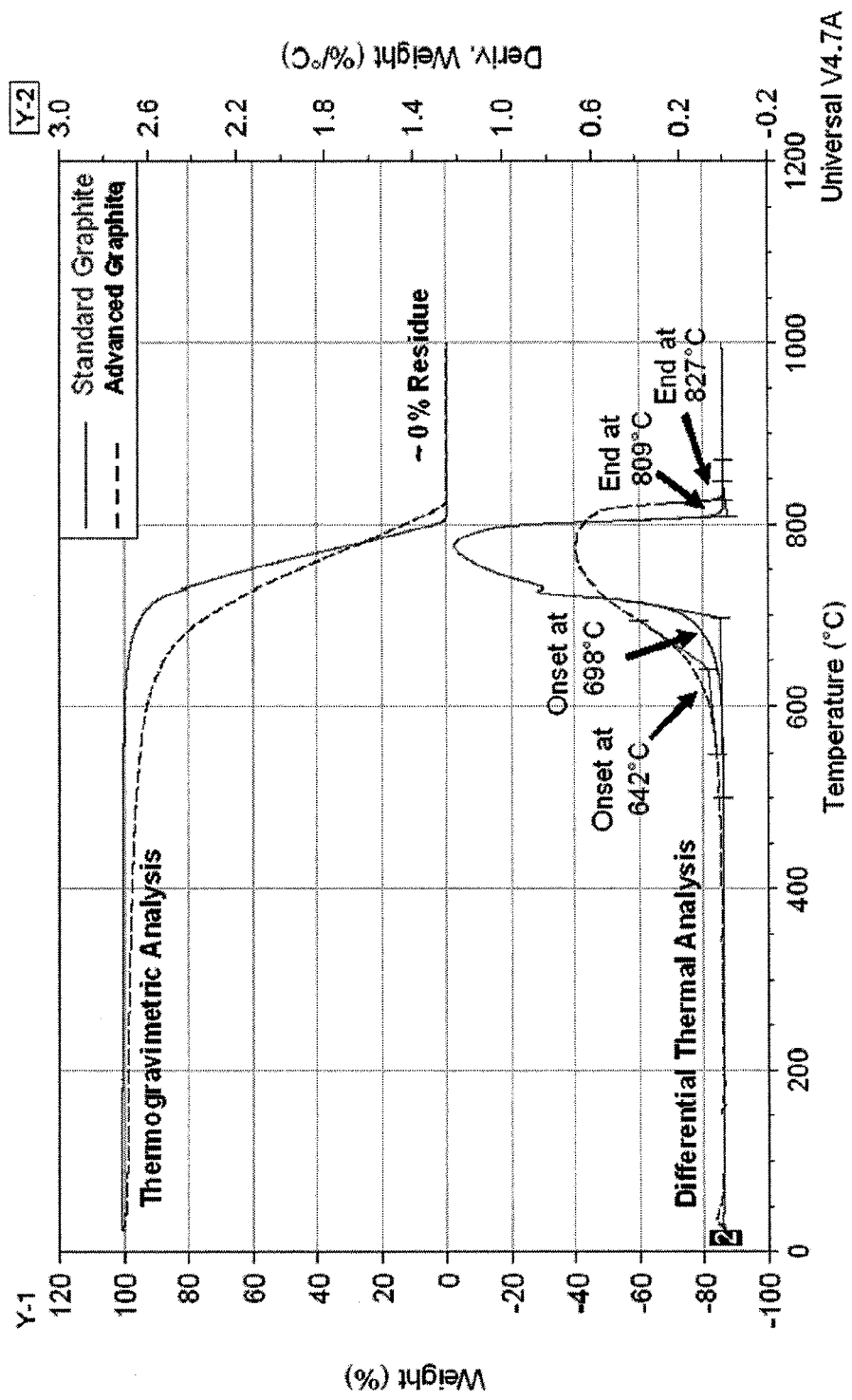
FIG. 1b is a graph representing the extent of periodic graphene layers compared by thermogravimetric analysis for the standard, battery-grade graphite and Advanced Graphite used in this work.

Although comparable, Advanced Graphite also onsets degradation at a lower temperature as compared to standard graphite, resulting from the presence of higher amorphous carbons and/or defective carbon sites (as seen in FIG. 1b). FIG. 1a is a graph representing the extent of periodic graphene layers compared by two-dimensional, wide-angle x-ray diffraction, while FIG. 1b represents the extent of periodic graphene layers compared by thermogravimetric analysis for the standard battery grade graphite and Advanced Graphite of the present invention. Wider degradation window for Advanced Graphite is consistent with wider FWHM result obtained from WAXD, indicating large crystal size distribution.

Figure 3A:
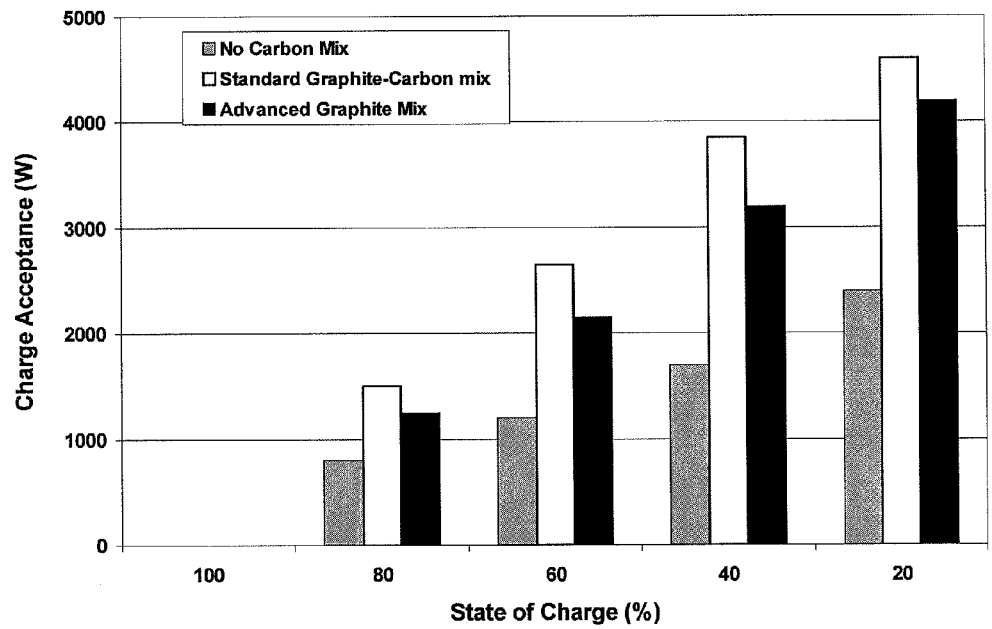
FIG. 3a is a bar graph representing regenerative-charge acceptance.
Figure 3B:
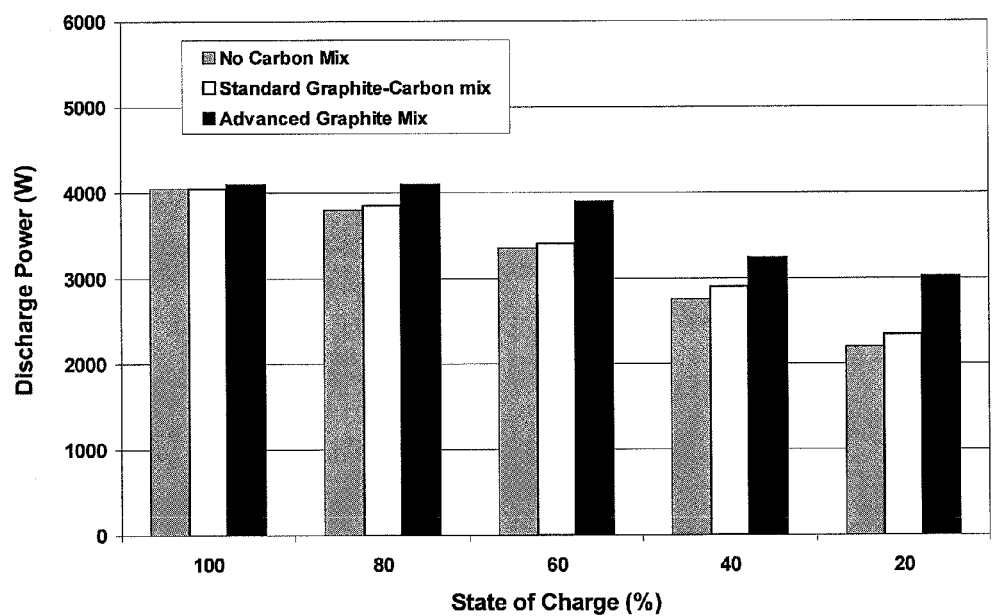
FIG. 3b is a bar graph representing peak power for 6V/24 Ah modules containing (i) no-carbon, standard, negative mix; (ii) negative mix with 1% by weight standard graphite and 1 wt % standard carbon black; and (iii) negative mix with 2% by weight-advanced carbon at different state-of-charges (SoC) at 25° C.

The charge acceptance power and power discharge at different SoC (at a constant 25° C.) are presented in FIGS. 3a and 3b for modules containing (i) no-carbon, standard-negative mix; (ii) negative mix with 1% by weight standard graphite and 1 wt % standard carbon black; and (iii) negative mix with 2% by weight advanced carbon. FIG. 3a is a bar graph representing regenerative charge acceptance (watts), while FIG. 3b is a bar graph representing peak power (watts) for 6V/24 Ah. The data was collected at different state-of-charge (SoC) values, ranging from 20% to 100% with 20% intervals. For reference, FIG. 1d is a chart depicting the comparable initial characterization of three spiral 6V/25 Ah modules used in the test.

Referring first to FIG. 3a, the graph indicates that a standard, graphite-carbon mix generally shows a higher charge acceptance as compared to both the no-carbon control mix and Advanced Graphite mix. The performance of the standard, graphite-carbon mix may be attributed to the presence of smaller-particulate, high-surface-area, carbon black.

In FIG. 3b, by contrast, the graph clearly indicates that the Advanced Graphite mix consistently yields the highest discharge power at all state-of-charge levels. The graph also shows the drastic drop in discharge power for the no-carbon, control mix and standard, graphite-carbon mix as the SOC decreases from 100% to 20%. The Advanced Graphite mix's outstanding performance may be attributed to the higher electrical conductivity of Advanced Graphite as compared to the standard graphite/carbon black mix. Remarkably, maximum improvement was observed at 20% SoC, where the Advanced Graphite mix showed more than 35% and 25% improvement over the control battery (no-carbon mix) and standard, graphite-carbon mix, respectively.

Figure 4:
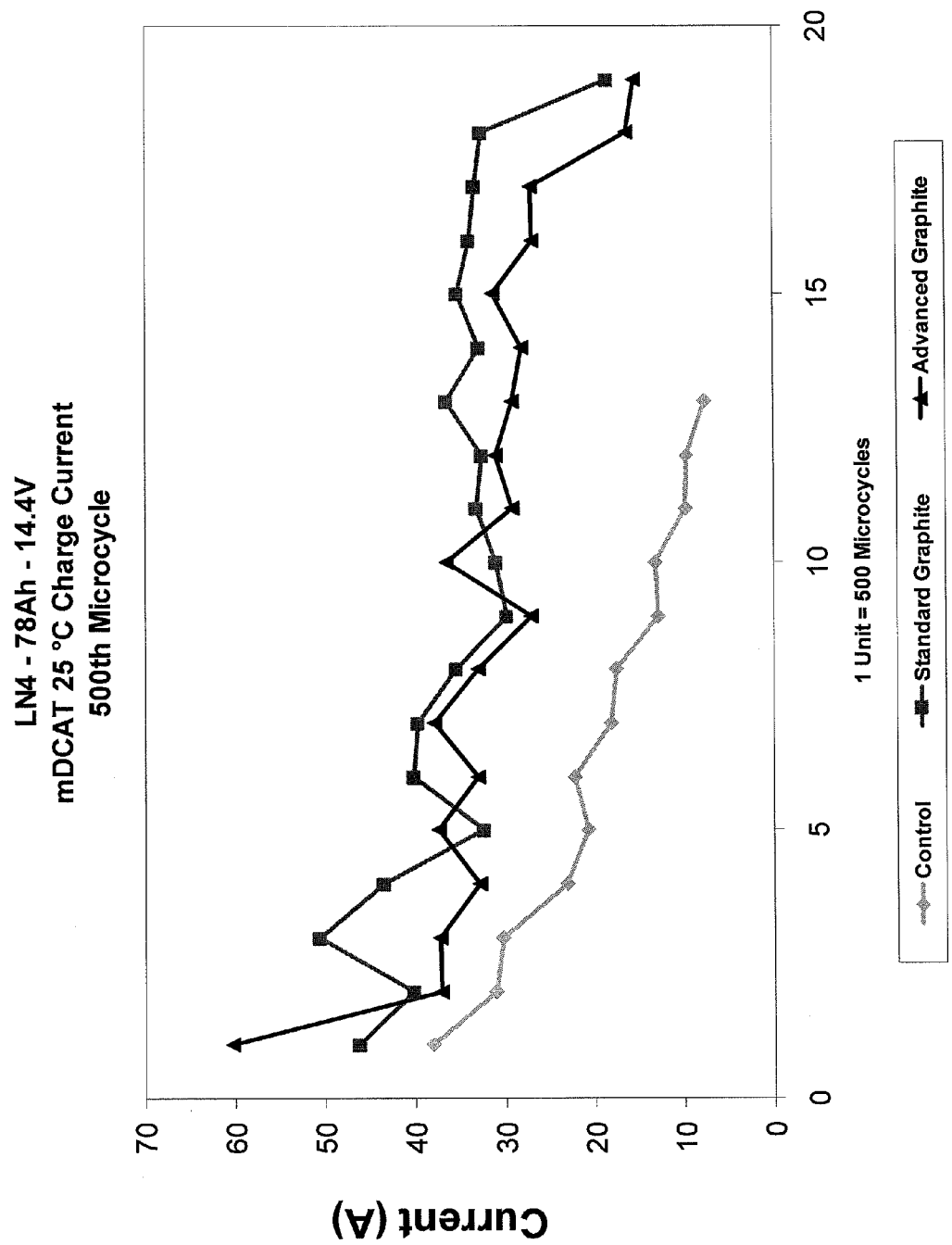
FIG. 4 is a graph representing charge current at 500th microcycle (end-of-test unit) in micro-hybrid dynamic charge acceptance test (mDCAT) for (i) no-carbon, standard, negative mix; (ii) negative mix with 1% by weight standard graphite and 1% by weight standard carbon black; and (iii) negative mix with 2% by weight advanced carbon with batteries at 80% SoC.

A micro-hybrid dynamic charge acceptance test (mDCAT) was performed on prismatic batteries (e.g., a battery that is prismatic, or rectangular, in shape rather than cylindrical) at 80% SoC to determine charge acceptance capability of batteries in hybrid electric vehicle (HEV) application at high rate partial state-of-charge (SoC) conditions. Charge current at 500th micro-cycle or end of test unit for different batteries at 25° C. is presented in FIG. 4. The results show higher charging current representing higher charge acceptance for both carbon containing groups compared to standard, no-carbon batteries. The control batteries reached end-of-test condition after 13 units of cycling (6,500 cycles), while carbon containing batteries continued to cycle beyond 10,000 cycles, representing longer cycle life.

The EUCAR, power-assist, cycle-life test is an important test for hybrid electric vehicle (HEV) applications carried out to simulate the power performance of batteries under partial state-of-charge cycling. The profile used for testing contains a test unit which repeats 10,000 times with the battery at 60% SoC and 2.5% depth-of-discharge. The battery is typically rested for a few hours after 10,000 cycles for the electrolyte to stabilize in the battery before further testing. This rest step in power-assist cycle-life tests does not typically represent actual use conditions. Therefore, a non-stop, power-assist, cycle-life test was devised, whereby the battery was cycled without rest until it reached failure condition. The non-stop, power-assist test also helps to differentiate various carbon groups which perform alike when rested after every 10,000 cycles.

Figure 5:
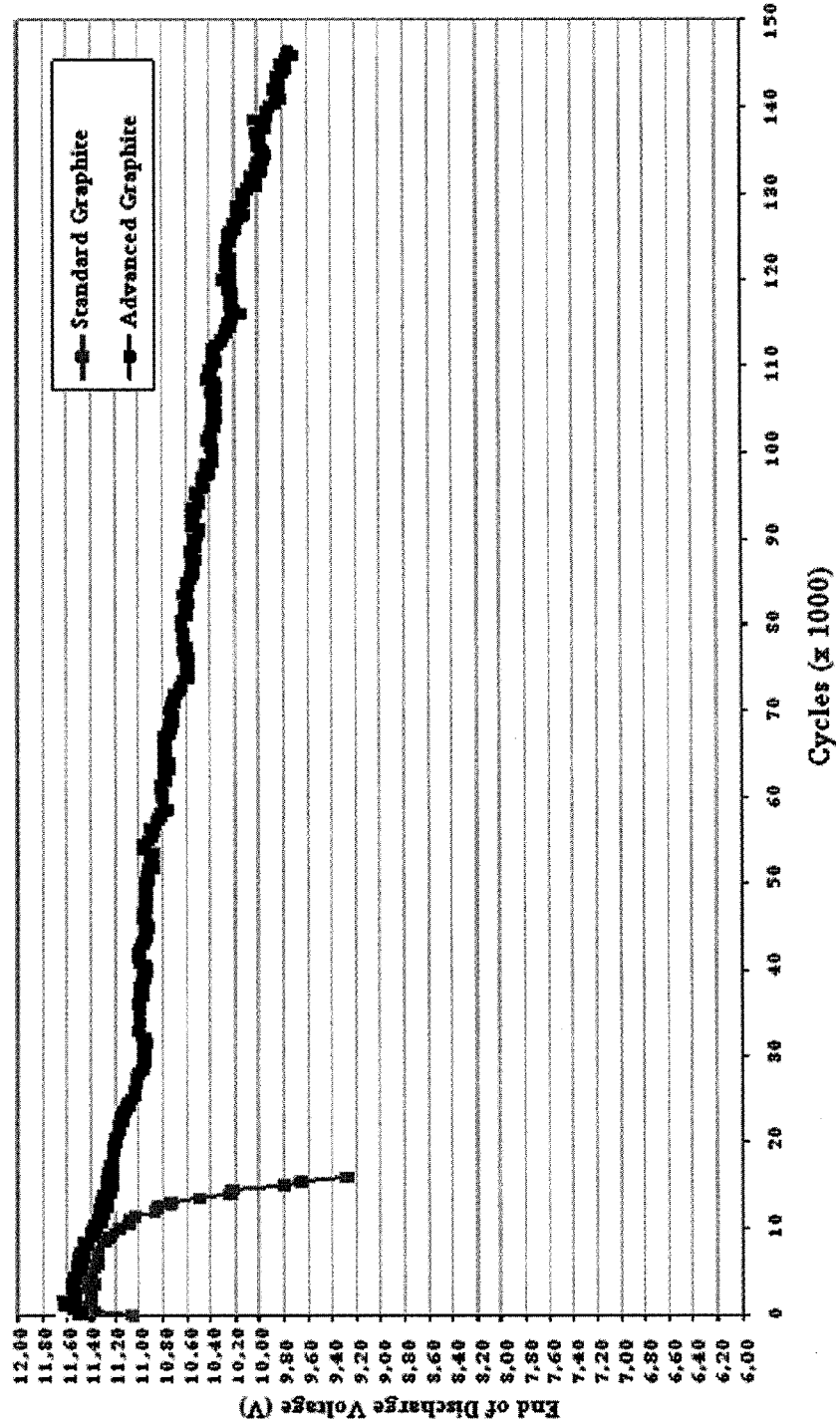
FIG. 5 is a graph representing end of discharge voltage for (i) negative mix with 1% by weight standard graphite and 1 wt % standard carbon black; and (ii) negative mix with 2% by weight-advanced carbon at 60% state-of-charges (SoC) and 2.5% depth-of-discharge (DoD) at 25° C. on non-stop, power assist cycle life.

Results of the non-stop, power-assist test is presented in FIG. 5, which shows the standard, graphite-carbon mix (1% by weight standard graphite and 1% by weight standard carbon black and a negative mix with 2% by weight advanced carbon)—the best performing group from previous results—reaching failure condition below 20,000 cycles. A significant and unexpected cycle life was achieved for the Advanced Graphite mix (2% by weight Advanced Graphite) where the battery was able to cycle beyond 145,000 cycles above the failure voltage of 9V. This important advancement in cycle life is the result of combining two important attributes of additives—higher surface area and higher electrical conductivity in a single graphite (i.e., Advanced Graphite).

Elimination of carbon black, with its inferior mechanical stability, from the negative paste mix, a typical additive to improve surface area and enhance charge acceptance, results in a robust battery which may be cycled efficiently over an extended period of time.

Advanced Graphite with ordered structures that are inert to electrochemical reactions during charge-discharge cycles and with surface area of at least ten times greater than typical battery-grade natural or synthetic graphites is an ideal candidate for lead-acid battery application. The use of this Advanced Graphite will advance the capabilities of valve-regulated, lead-acid battery to compete with other chemistries for HEV application.

Figure 6:
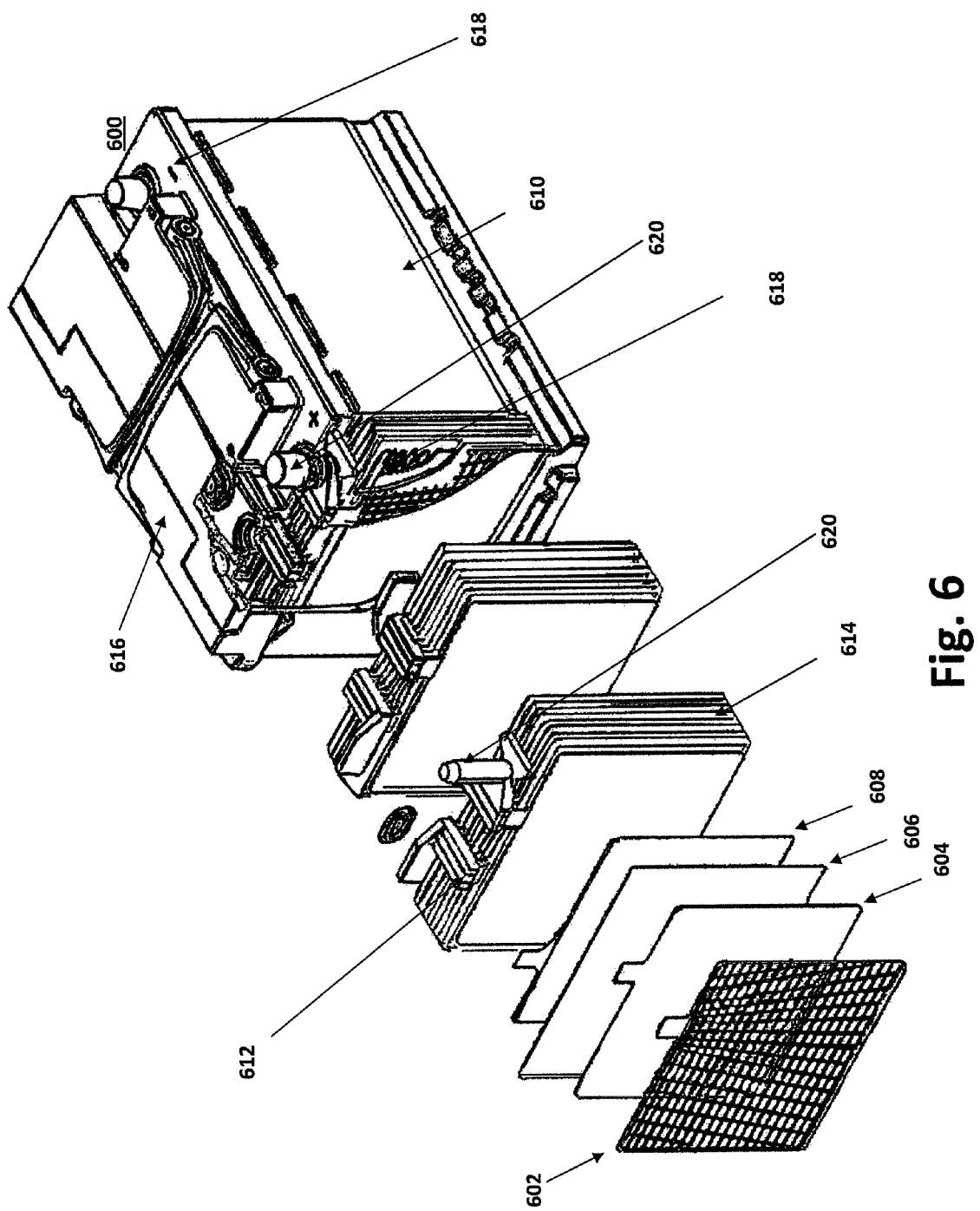
FIG. 6 is a diagram of an example prismatic lead-acid battery capable of carrying out the present invention.
Figure 7:
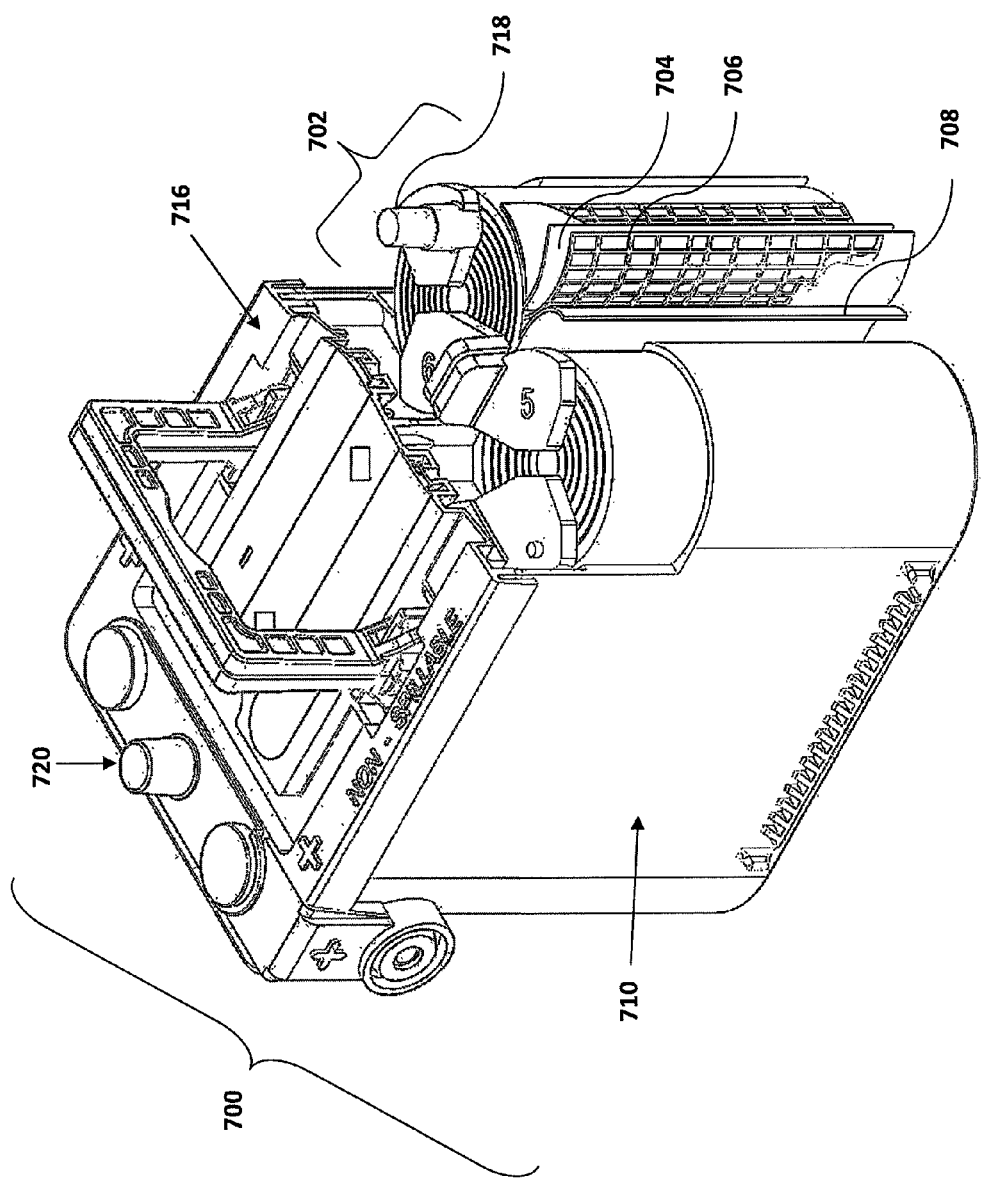
FIG. 7 is a diagram of an example spiral-wound lead-acid battery capable of carrying out the present invention.

FIG. 6 illustrates a prismatic lead-acid battery 600 enabled to be used with an Advance Carbon paste. As seen in the diagram, the lead-acid battery is comprised of a lower housing 610 and a lid 616. The cavity formed by the lower housing 610 and a lid 616 houses a series of plates which collectively form a positive plate pack 612 (i.e., positive electrode) and a negative plate pack 614 (i.e., negative electrode). The positive and negative electrodes are submerged in an electrolyte bath within the housing. Electrode plates are isolated from one another by a porous separator 606 whose primary role is to eliminate all contact between the positive plates 604 and negative plates 608 while keeping them within a minimal distance (e.g., a few millimeters) of each other. The positive plate pack 612 and negative plate pack 614 each have an electrically connective bar travelling perpendicular to the plate direction that causes all positive plates to be electrically coupled and negative plates to be electrically coupled, typically by a tab on each plate. Electrically coupled to each connective bar is a connection post or terminal (i.e., positive 620 and negative post 618). The Advanced Carbon paste of the present application may be pressed in to the openings of grid plates 602, which, in certain embodiments, may be slightly tapered on each side to better retain the paste. Although a prismatic AGM lead-acid battery is depicted, the Advance Carbon additive may be used with any lead-acid battery, including, for example, flooded/wet cells and/or gel cells. As seen in FIG. 7, the battery shape need not be prismatic, it may be cylindrical, or a series of cylindrical cells arranged in various configurations (e.g., a six-pack or an off-set six-pack).

A carbon containing paste may be prepared having an optimum viscosity (260-310 grams/cubic inch) and penetration (38-50). The carbon paste may then be applied to a lead alloy grid that may be cured at a high temperature and humidity. In cylindrical cells, positive and negative plates are rolled with a seperator and/or pasting papers into spiral cells prior to curing. Once cured, the plates are further dried at a higher temperature and assembled in the battery casing. Respective gravity acid may be used to fill the battery casing. Batteries are then formed using an optimized carbon batteries formation process (i.e., profile). The formation process may include, for example, a series of constant current or constant voltage charging steps performed on a battery after acid filling to convert lead oxide to lead dioxide in positive plate and lead oxide to metallic lead in negative plate. In general, carbon containing negative plates have lower active material (lead oxide) compared to control plates. Thus, the formation process (i.e., profile) for carbon containing plates is typically shorter.

FIG. 7 illustrates a spiral-wound lead-acid battery 700 enabled to be used with an Advance Carbon paste. As in the prismatic lead-acid battery 600, a spiral-wound lead-acid battery 700 is comprised of a lower housing 710 and a lid 716. The cavity formed by the lower housing 710 and a lid 716 house one or more tightly compressed cells 702. Each tightly compressed cell 702 has a positive electrode sheet 704, negative electrode sheet 708 and a separator 706 (e.g., an absorbent glass mat separator). AGM batteries use thin, sponge-like, absorbent glass mat separators 706 that absorb all liquid electrolytes while isolating the electrode sheets. A carbon containing paste may be prepared having an optimum viscosity (260-310 grams/cubic inch) and penetration (38-50). The carbon paste may then be applied to a lead alloy grid that may be cured at a high temperature and humidity. In cylindrical cells, positive and negative plates are rolled with a seperator and/or pasting papers into spiral cells prior to curing. Once cured, the plates are further dried at a higher temperature and assembled in the battery casing. Respective gravity acid may be used to fill the battery casing. Batteries are then formed using an optimized carbon batteries formation process.

The Advance Graphite paste may be prepared using one of many known processes. For example, U.S. Pat. No. 6,531,248 to Zguris et al. discusses a number of known procedures for preparing paste and applying paste to an electrode. For example, a paste may be prepared by mixing sulfuric acid, water, and various additives (e.g., Advance Graphite and/or other expanders) where paste mixing is controlled by adding or reducing fluids (e.g., $H_2O$, $H_2SO_4$, tetrabasic lead sulfate, etc.) to achieve a desired paste density. The paste density may be measured using a cup with a hemispherical cavity, penetrometer (a device often used to test the strength of soil) and/or other density measurement device. A number of factors can affect paste density, including, for example, the total amount of water and acid used in the paste, the specific identity of the oxide or oxides used, and the type of mixer used. Zguris also discusses a number of methods for applying a paste to a battery electrode. For example, a "hydroset" cure involves subjecting pasted plates to a temperature (e.g., between 25 and 40° C.) for 1 to 3 days. During the curing step, the lead content of the active material is reduced by gradual oxidation from about 10 to less than 3 weight percent. Furthermore, the water (i.e., about 50 volume percentage) is evaporated.

Figure 8:
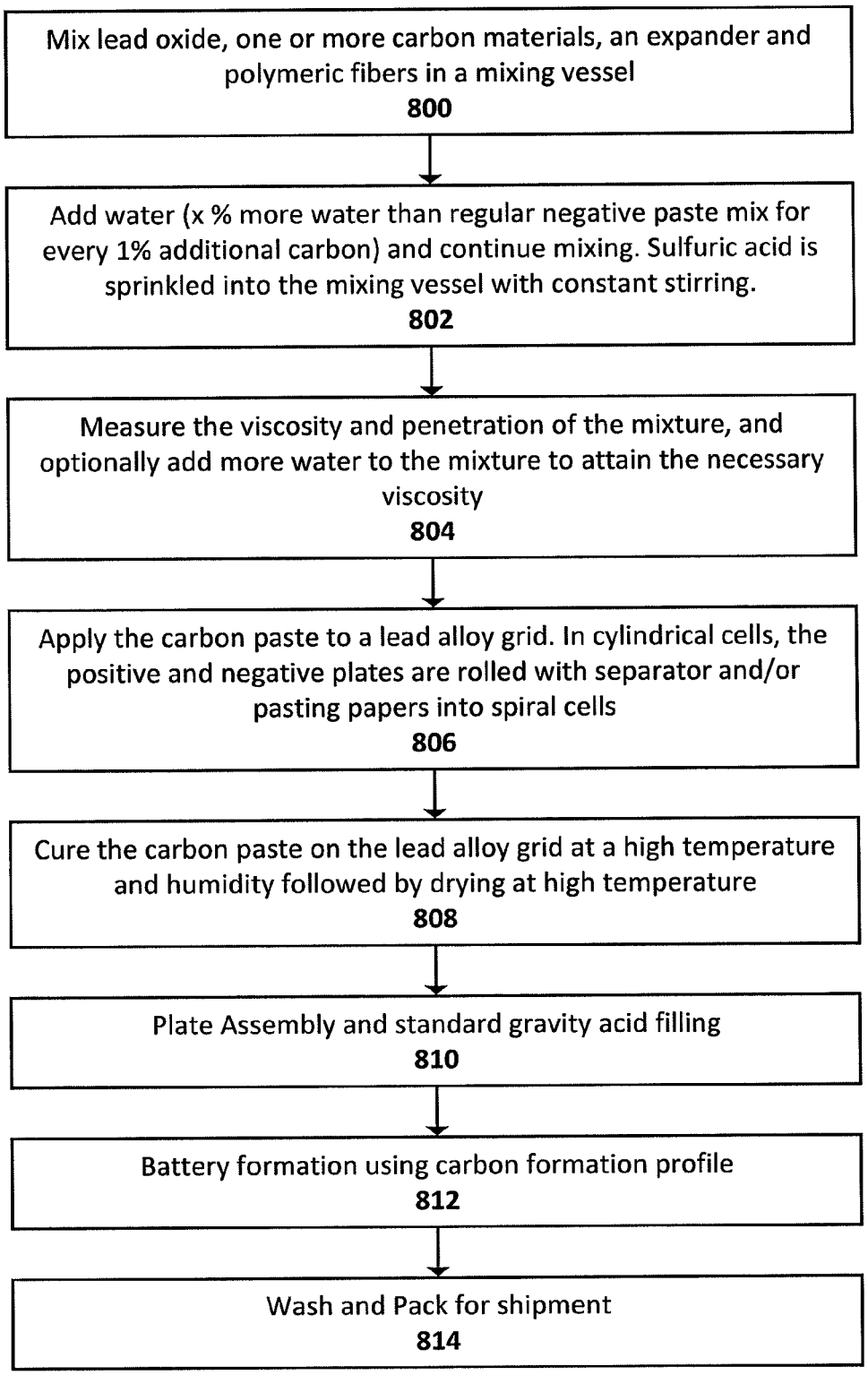
FIG. 8 is a diagram demonstrating a method of preparing an Advance Graphite paste and battery electrode.

FIG. 8 is a flow chart demonstrating a method of preparing an Advance Graphite paste and applying it to a battery electrode. To form the paste, paste ingredients (e.g., Advanced Graphite, graphite, carbon black, lignin derivatives, $BaSO_4$, $H_2SO_4$, $H_2O$, etc.) are mixed 800 until a desired density (e.g., 4.0 to 4.3 g/cc) is determined. The carbon containing paste may be prepared by adding lead oxide, one or more carbon expanders and polymeric fibers to a mixing vessel, mixing the materials for 5-10 minutes using a paddle type mixer (800). Water may be added (x % more water than regular negative paste mix for every 1% additional carbon) and continue mixing. A carbon paste (e.g., a paste containing Advance Graphite) would preferably contain 0.5-6% carbon-based additive by weight with a more preferred range of about 1-4% or 1-3%. However, a most preferred carbon paste would contain about 2-3% carbon-based additive by weight.

Once the carbon containing paste has been prepared, sulfuric acid may be sprinkled into the mixing vessel with constant stirring and mixing may be continued for additional 5-10 minutes (802). Viscosity and penetration of the resulting carbon paste may be measured and water may be added to the paste to attain necessary visosity (804). This carbon containing paste may then be applied to lead alloy grid (806) followed by curing at high temperature and humidity (808). In cylindrical cells, the positive and negative plates are rolled with a seperator and/or pasting papers into spiral cells before curing. Cured plates are further dried at higher temperature. Dried plates are assembled in the battery casing and respective gravity acid is filled into the battery casing (810). Batteries are then formed using an optimized carbon batteries formation profile (812).

The individual components shown in outline or designated by blocks in the attached Drawings are all well-known in the battery arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

All U.S. and foreign patent documents, all articles, brochures, and all other published documents discussed above are hereby incorporated by reference into the Detailed Description of the Preferred Embodiment.

What is claimed is:

1. An energy storage device, comprising:
an electrode comprising lead;
an electrode comprising lead dioxide;
a separator between the electrode comprising lead and the electrode comprising lead dioxide;
an aqueous solution electrolyte containing sulfuric acid; and
a carbon-based additive comprising graphite having a specific surface area of approximately 250 to 550 $m^2/g$, wherein the carbon-based additive is a disordered carbon additive in negative active material with (i) crystallinity of 60% or lower, (ii) degradation onset temperature of 650° C. or lower; and (iii) degradation temperature range of a minimum 170° C. or higher.

2. The energy storage device of claim 1, wherein the carbon-based additive has a specific surface area of substantially 250 to 350 $m^2/g$.

3. The energy storage device of claim 1, wherein the carbon-based additive is mixed with a negative, dry, unformed paste having a surface area greater than 3 $m^2/g$.

4. The energy storage device of claim 3, wherein the concentration of the carbon-based additive relative to the paste is approximately 2 to 3% by weight.

5. The energy storage device of claim 1, wherein the carbon-based additive is graphite.

6. The energy storage device of claim 1, wherein the carbon-based additive is used in a paste for a negative plate of battery and has a total pore volume of greater than about 0.2 $cm^3/g$ with a predominant pore size of less than 20 Å.

7. The energy storage device of claim 1 wherein the carbon-based additive is used in a paste for a negative plate of battery and has a total pore volume of greater than about 0.2 $cm^3/g$ with a predominant pore size of 20 Å-500 Å.

8. An energy storage device, comprising:
an electrode comprising lead;
an electrode comprising lead dioxide;
a separator between the electrode comprising lead and the electrode comprising lead dioxide;
an aqueous solution electrolyte containing sulfuric acid; and
a carbon-based additive comprising graphite having a specific surface area of approximately 250 to 550 $m^2/g$, wherein the carbon-based additive has (i) between about 20 and 40 percent microporous carbon particles of the total amount of carbon-based additive by weight; (ii) between about 60 and 70 percent mesoporous carbon particles of the total amount of carbon-based additive by weight; and (iii) between about 0 and 10 percent macroporous carbon particles of the total amount of carbon-based additive by weight.

9. The energy storage device of claim 1 wherein the energy storage device is capable of at least 145,000 cycles in a non-stop, power-assist test.

10. A battery, including a negative plate, comprising a carbon-based additive comprising graphite having a surface area of at least 3 $m^2/g$ when an amount of the carbon-based additive in a paste is approximately 2 to 3% by weight, wherein the carbon-based additive is a disordered carbon additive in negative active material with (i) crystallinity of 60% or lower, (ii) degradation onset temperature of 650° C. or lower; and (iii) degradation temperature range of a minimum 170° C. or higher.

11. The battery of claim 10, wherein the carbon-based additive is a graphite additive having a specific surface area of approximately 250 to 550 $m^2/g$.

12. The battery of claim 10 wherein the carbon-based additive is a graphite additive having a specific surface area of approximately 250 to 350 $m^2/g$.

13. The battery of claim 10, wherein the carbon-based additive has a total pore volume of greater than about 0.2 $cm^3/g$ with a predominant pore size of less than 20 Å.

14. The battery of claim 10, wherein the carbon-based additive has a total pore volume of greater than about 0.2 $cm^3/g$ with a predominant pore size of 20 Å-500 Å.

15. A battery, including a negative plate, comprising a carbon-based additive comprising graphite having a surface area of at least 3 $m^2/g$ when an amount of the carbon-based additive in a paste is approximately 2 to 3% by weight, wherein the carbon-based additive has (i) between about 20 and 40 percent microporous carbon particles of the total amount of carbon-based additive by weight; (ii) between about 60 and 70 percent mesoporous carbon particles of the total amount of carbon-based additive by weight; and (iii) between about 0 and 10 percent macroporous carbon particles of the total amount of carbon-based additive by weight.

16. The battery of claim 10, wherein the battery is capable of at least 145,000 cycles in a non-stop, power-assist test.

* * * * *